United States Patent [19]

Lermann et al.

[11] 4,034,894
[45] July 12, 1977

[54] FILM-SHEET CASSETTE

[75] Inventors: Peter Lermann, Narring; Günter Fauth, Unterhaching, both of Germany

[73] Assignee: AGFA-Gevaert Aktiengesellschaft, Leverkusen, Germany

[21] Appl. No.: 661,338

[22] Filed: Feb. 25, 1976

[30] Foreign Application Priority Data

Feb. 28, 1975 Germany ............................ 2508705

[51] Int. Cl.² ........................................ B65H 1/08
[52] U.S. Cl. ................................ 221/227; 221/232
[58] Field of Search .................. 221/227, 231, 232; 354/276, 176, 180; 271/126

[56] References Cited

U.S. PATENT DOCUMENTS

| | | | |
|---|---|---|---|
| 918,882 | 4/1909 | Mills | 221/227 |
| 3,536,231 | 10/1970 | Knickerbocker | 221/227 X |

Primary Examiner—Allen N. Knowles
Attorney, Agent, or Firm—Michael J. Striker

[57] ABSTRACT

A film-sheet cassette has a spring which presses a stack of sheets against a wall of the cassette which is formed with an exposure window. An operator or slider is engageable with the uppermost sheet to displace it out of the end of the cassette through an unloading slot. The spring that urges the sheets against the window wall of the cassette is unloaded during the discharge operation so as to ease sliding-out of the uppermost film sheet. Abutments inside the cassette aligned with the unloading slot define a pair of edge slits having a width slightly greater than the thickness of one film sheet so as to prevent the accidental discharge of more than one sheet at a time.

9 Claims, 5 Drawing Figures

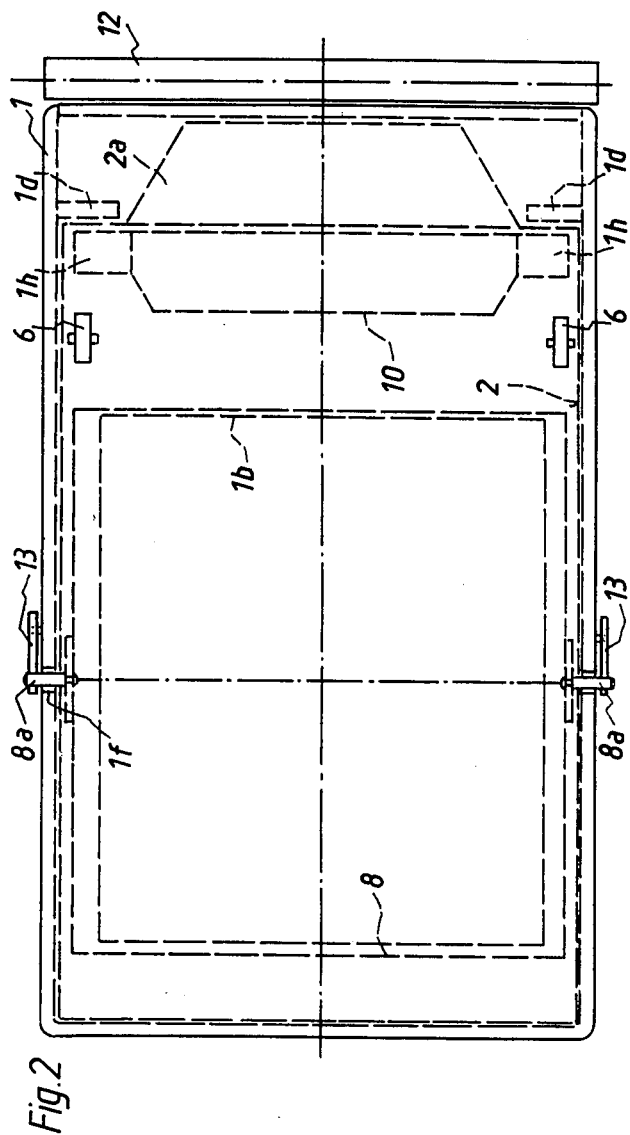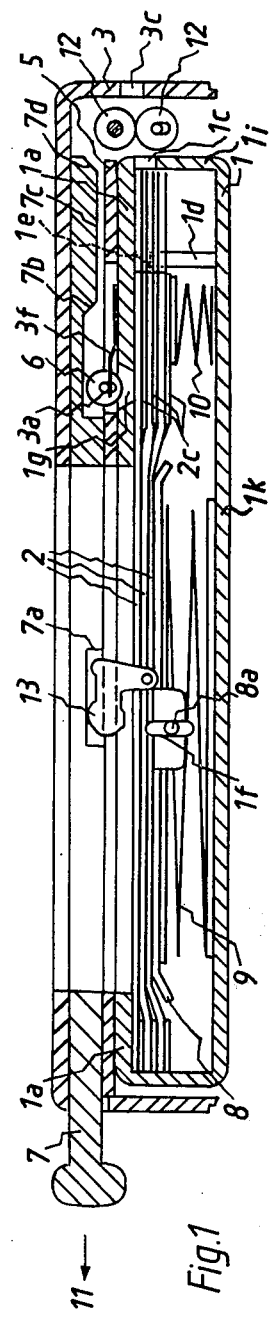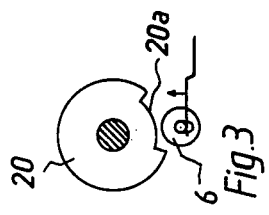

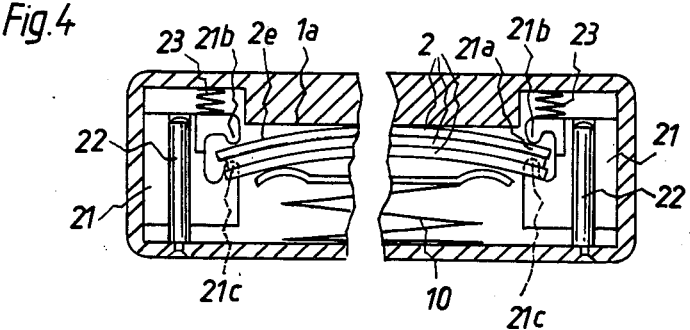
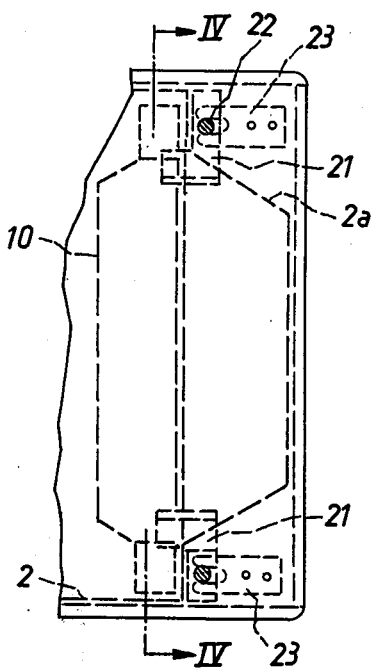

FILM-SHEET CASSETTE

BACKGROUND OF THE INVENTION

The present invention relates to an apparatus for holding a stack of sheets and for dispensing the sheets one at a time. More particularly, this invention concerns a cassette for holding a stack of unexposed photographic-film sheets.

A stack of photographic sheet material held in a cassette is normally displaced out of the cassette, a sheet at a time, after exposure of the topmost sheet by sliding this topmost sheet laterally off the stack and out through a slot in the end of the cassette. In order to insure proper positioning of the sheet in the focal plane of the camera in which the cassette housing is to be fitted, the stack of sheets in the disposable cassette are usually held against a window in the front of the cassette by means of a plate which is pressed toward this window by means of a compression spring which is braced between this support plate and the sidewall of the housing opposite that wall that is formed with the window.

In order to maintain best planarity of the topmost or end sheet of the stack it is necessary to press it with considerable spring pressure against the windowed wall of the housing. The greater this spring pressure is, however, the harder it is to slide the end sheet off the stack. Thus the spring force is often made to be less than that force which would achieve best planarity in order to be able to readily pull out the exposed upper sheet.

Another disadvantage of the known cassettes, particularly in arrangements having self-developing film, is that more than one of the sheets occasionally is ejected at a time. Since the sheets are normally pulled out between a pair of pressure rollers, the extra ejected sheet must be discarded, as it is rendered useless once it is pulled out of the cassette. This accident is particularly likely to happen when the spring force urging the stack against the windowed wall of the cassette is great.

SUMMARY OF THE INVENTION

It is therefore an object of the present invention to provide an improved cassette.

Another object is the provision of such a cassette which can be used to hold photographic-film sheet material and to dispense these sheets one at a time.

Yet another object is the provision of such an apparatus which overcomes the above-given disadvantages.

These objects are attained according to the present invention in an apparatus comprising a cassette housing having a side wall and an end wall extending from the side wall and formed with a throughgoing slot. Means including a spring urges a stack of sheets with a predetermined spring pressure against the side wall with an end sheet of the stack pressing against this side wall. Further means including an operator is engageable with ene end sheet for sliding the sheet off the stack and out of the housing through the slot in the end wall thereof. Finally in accordance with this invention means is provided jointly operable with the operator for reducing the spring pressure during sliding of the end sheet. Thus in accordance with the invention it is possible to provide a very strong spring to hold the end sheet in perfect planarity against the window in the cassette side wall. At the same time, however, the spring force is automatically reduced as a sheet is slid out of the housing so that accidental discharge of two sheets at one time is avoided and the discharge operation can be carried out relatively easily.

In accordance with another feature of this invention the sheet is of image-bearing photograhic material and the housing has a second side wall spaced from the first-mentioned side wall. The urging means includes a support carrying the stack, and the above-mentioned spring is braced between the support and the second side wall. Hereinafter these two side walls will be referred to as the top and bottom walls for sake of simplicity. No limitation as to the relative orientation of these walls is, however, intended.

According to yet another feature of this invention the first side or top wall is formed with at least one throughgoing aperture and the operator is a roller engageable through this aperture with the top or end sheet. The sliding means may include a slider having a surface engageable with the roller so that when the slider is displaced it rotates the roller and displaces the end sheet out. It is also possible for the sliding means to include a second roller engageable with the first-mentioned roller for rotating it.

According to yet another feature of this invention the support has at least one pin projecting laterally through the housing and the reducing means includes a lever engageable wihh this pin for pressing the pin toward the second wall. Such displacement of the support automatically compresses the spring and relieves the spring pressure. A second spring is similarly positioned between the second or bottom wall and the stack only adjacent the slot. This second spring bears on the stack continuously with substantially less pressure than the first-mentioned spring.

In accordance with further features of this invention a pair of abutments are provided aligned with the edge of the stacks toward the slot and defining in line with this slot an opening having a width equal to more than the thickness of one of the sheets and less than twice this thickness. Thus only one sheet can pass out of the housing through the slot at a time. It is possible to form these abutments as a pair of abutments displaceable toward and away from the bottom wall and each formed with a slit having a width equal to more than the above-mentioned thickness and less than twice this thickness.

With the apparatus according to the present invention it is a relatively simple matter to discharge the top sheet from the stack inside the cassette laterally out of the cassette. The actuation force can be relatively light because during discharge the spring that normally presses the stack against the top wall of the housing is unloaded so that little lateral pressure is needed to overcome friction and discharge the exposed top sheet.

It is also understood that this apparatus as described above can be used in other applications. For instance such an arrangement is readily usable in a cassette for holding slides in an automatic slide projector so that only the end slide is discharged from the cassette at one time with the spring normally holding all the slides tightly in place inside the cassette.

The novel features which are considered as characteristic for the invention are set forth in particular in in the appended claims. The invention itself, however, both as to its construction and its method of operation, together with additional objects and advantages thereof, will be most understood from the following description of specific embodiments when read in connection with the accompanying drawings.

BRIEF DESCRIPTION OF THE DRAWINGS

FIG. 1 is a longitudinal section through a cassette in a holder according to the present invention;

FIG. 2 is a top view of the cassette of FIG. 1;

FIG. 3 is a large-scale sectional view of a varient of a detail of the arrangement of FIG. 1;

FIG. 4 is a cross-section through another cassette in accordance with this invention; and FIG. 5 is a top view of the cassette end shown in FIG. 4.

DESCRIPTION OF THE PREFERRED EMBODIMENTS

As shown in FIGS. 1 and 2 a film cassette has a generally parallepipedal housing 1 holding a stack of unexposed self-devloping film sheet 2 and adapted be received in a holder 3 of a camera. The cassette housing 1 has a top wall 1a formed with a large exposure window 1b and a bottom wall 1k parallel to the wall 1a. In addition this housing 1 has an end wall 1i formed adjacent the top wall 1a with a slit 1c. A support plate 8 carried on a compound flat spring 9 itself anchored on the bottom wall 1k presses the stack of film sheets 2 against the wall 1a at the window 1b. When new the uppermost sheet in the stack is opaque so that only after the cassette 1 is mounted in the camera is this sheet removed as will be described below to allow exposure of the uppermost film sheet through the window 1b.

Each sheet has at its one end a capsule 2c filled with developer-activating paste and beyond this with a trapezoidal tab 2a of substantially narrower dimensions than the rest of the film sheet 2. Another compound flat spring 10 secured to the bottom wall 1k presses the capsule ends of the sheets 2c at locations 1h sides of the tabs 2a against the upper wall 1a the housing. This spring 10 has considerably less spring force than the spring 9. In addition the housing is formed adjacent the slot 1c with a pair of upstanding abutments 1d that define a pair of narrow slits 1e having a height equal to slightly more than the thickness of sheet 2 but slightly less than the thickness of two such sheets 2. The tabs 2a project between the abutments 1d, but a sheet 2 can only pass over these abutments 1d in the slits 1e.

For unloading the holder 3 has a slider 7 slidable between the top wall of this holder 3 and an intermediate plate 5 which lies directly on top of the upper wall 1a of the housing 1. Windows in the slider 7, holder 3 and wall 5 register to allow exposure of the uppermost sheet 2. In addition the cassette 1 carries a pair of rollers 6 pivotal on axes 3a on a small leaf springs 3f. These rollers 6 are engageable through spaced-apart holes 1g with the uppermost sheet 2 to either side of the window 1b so that these rollers 6 will not travel on an exposed portion of the film. Furthermore, a pair of pins 8a extending from the support 8 pass through holes 1f in the side of the housing 1 and are engageable by levers 13 carried on the camera. The holder 8 is also provided with pair of rollers 12 that form a nip aligned with the slit 1c and with another slit 3c the slit 1c and with another slit 3c so that as the film is pulled out of the cassette 1 it passes between these rollers 12 to crush the developer-activator capsule 2c and start the developing process. arrow 11 of FIG. 1 causes the notches 7a in the slider 7 to engage the levers 13, pivoting them counterclockwise as shown in FIG. 1 to press down on the projecting pins 8a. This action unloads the spring 9 almost fully. At the same time sliding of the slider 7 cams the rollers 6 down in the holes 1g by means of the inclined camming surface 7b. Further displacement of this slide 7 with the rollers 6 pressed down through the holes 1g against the topmost sheet 2 rotates these rollers by means of frictional engagement with the surface 1c so as to displace the uppermost sheet to the right as seen in FIG. 1, pushing the tab 7a out between the rollers 12 and from the slot 3c. The rollers 6 can move up again out of contact with the uppermost sheet 2c once the slider 7 has been pulled far enough to allow these rollers to move up on the inclined surface 7d. Then the user merely grips the projecting flap 2a and pulls the topmost sheet 2 out of the slot 3c, crushing the developer-activator capsule between the rollers 12 and starting the developing process.

During this entire operation spring 9 is, as described above, unloaded and only the relatively light spring 10 is pressing against the film sheets 2. This spring force must be maintained in order to insure proper alignment of the edges of the uppermost sheet 2 with the slits 1e so that only one sheet can be pulled out of the capsule 1. Nonetheless this force is minor and is easily overcome by the user. It is noted that means can be provided which prevent displacement of the slider 7 back into the housing until the entire uppermost sheet 2 has been removed.

It is also possible as shown in FIG. 3 to provide a motor-driven or manually roller 20 having a cutout 20a so that when rotated the roller 20 will displace the roller 6 down and turn it in order to push out the uppermost sheet. Furthermore it is possible to provide a common spring replacing the two springs 9 and 10, with the spring only being partially unloaded during discharge of the top film sheet.

FIGS. 4 and 5 shows an arrangement identical to FIG. 1 wherein the fixed abutments 1d forming slits 1e are replaced by sliders 21 carried on pins 22 secured in the housing 1. The upper side or jaw 21b forming the split 21a of each of these sliders 21 is pressed by springs 23 on the upper side 2e of the uppermost film sheet 2. Thus on bending of the uppermost film sheet the slits 21a follow this bending so that the uppermost sheet remains between the two parts 21b and 21c defining the slot 21a and sure displacement of the arrangement out of the cassette is insured.

With the system according to the present invention it is possible in a relatively inexpensive and disposable cassette made of synthetic-resin material to obtain a sure and easy discharging of the film sheets one at a time from the cassette. Any possibility of the film jamming up is almost entirely eliminated while at the same time good planarity of the uppermost sheet is insured for perfect focusing.

It will be understood that each of the elements described above, or two or more together, may also find a useful application in other types of holders differing from the types described above.

While the invention has been illustrated and described as embodied in a film-sheet cassette, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for holding a stack of sheets of photographic material and for dispensing same one at a time, said apparatus comprising:
   a cassette housing having a side wall and an end wall extending from said side wall and formed with a throughgoing slot;
   means including a spring for urging said stack with a predetermined spring pressure against said side wall with an end sheet of said stack pressing against said side wall, said side wall being formed with a throughgoing window alignable with said end sheet for exposure thereof;
   means including an operator engageable with said end sheet for sliding said end sheet off said stack and out of said housing through said slot; and
   means jointly operable with said operator for reducing said spring pressure during sliding of said end sheet.

2. The apparatus defined in claim 1 wherein said housing has a second side wall spaced from the first-mentioned side wall, the urging means includes a support carrying said stack, and said spring is braced between said support and said second side wall.

3. The apparatus defined in claim 2 wherein said first side wall is formed with at least one throughgoing aperture, said operator being a roller engageable through said aperture with said end sheet.

4. The apparatus defined in claim 2 wherein the sliding means includes a slider having a surface engageable with said roller and displaceable with said surface engaging said roller to rotate same and displace said end sheet.

5. The apparatus defined in claim 2 wherein the sliding means includes a second roller engageable with the first-mentioned roller for rotating same.

6. The apparatus defined in claim 2 wherein said support has at least one pin projecting laterally through said housing and the reducing means includes a lever engageable with said pin for pressing said pin toward said second wall.

7. The apparatus defined in claim 6, further comprising a second spring braced between said second wall and said stack adjacent said slot only, said second spring bearing on said stack with substantially less pressure than the first-mentioned spring.

8. The apparatus defined in claim 2, further comprising a pair of abutments aligned with the edge of said stack toward said slot and defining in line with said slot an opening having width equal to more than the thickness of one of said sheets and less than twice said thickness.

9. The apparatus defined in claim 2, further comprising inside said housing to each side of said slot a pair of abutments displaceable toward and away from said second wall and each formed with a slit having a width equal to more than the thickness of one of said sheets and less than twice said thickness.

* * * * *